United States Patent
Müller

(10) Patent No.: US 10,405,185 B2
(45) Date of Patent: Sep. 3, 2019

(54) REDUNDANTLY OPERABLE INDUSTRIAL COMMUNICATION SYSTEM, METHOD FOR OPERATION THEREOF AND RADIO SUBSCRIBER STATION

(71) Applicant: SIEMENS AKTIENGESELLSCHAFT, München (DE)

(72) Inventor: Jörg Müller, Linkenheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/097,399

(22) PCT Filed: Mar. 17, 2017

(86) PCT No.: PCT/EP2017/056359
§ 371 (c)(1),
(2) Date: Oct. 29, 2018

(87) PCT Pub. No.: WO2017/186404
PCT Pub. Date: Nov. 2, 2017

(65) Prior Publication Data
US 2019/0159032 A1    May 23, 2019

(30) Foreign Application Priority Data
Apr. 29, 2016    (EP) .................... 16167676

(51) Int. Cl.
*H04L 29/06* (2006.01)
*H04W 12/08* (2009.01)
(Continued)

(52) U.S. Cl.
CPC ....... *H04W 12/08* (2013.01); *H04L 12/40182* (2013.01); *H04L 12/4641* (2013.01); *H04W 88/06* (2013.01); *H04W 88/08* (2013.01)

(58) Field of Classification Search
CPC ......... H04L 12/4641; H04L 12/40182; H04W 88/08
See application file for complete search history.

(56) References Cited

U.S. PATENT DOCUMENTS

| 9,973,951 B1 * | 5/2018 | Rai ....................... H04W 24/08 |
| 2008/0095088 A1 * | 4/2008 | Ryu ................... H04W 36/0011 370/311 |

(Continued)

FOREIGN PATENT DOCUMENTS

WO    WO2014/187893    11/2014

OTHER PUBLICATIONS

Zhang et al., "Efficient mobility management for vertical handoff between WWAN and WLAN", IEEE Communications Magazine (vol. 41 , Issue: 11 , Nov. 2003) (Year: 2003).*

(Continued)

*Primary Examiner* — Morshed Mehedi
(74) *Attorney, Agent, or Firm* — Cozen O'Connor

(57) ABSTRACT

A radio communication system for an industrial automation system in which at least a first and a second communication device are redundantly linked to an industrial communication network, wherein the first and second communication devices are each connected indirectly or directly to a particular first radio subscriber station or radio base station and to a particular second radio subscriber station or radio base station via the first communication network connection and via the second communication network connection of the communication devices, where the radio subscriber stations interchange messages about available radio base stations among one another and use the messages to coordinate which of the radio subscriber stations has exclusive authorization for a radio link to a selected radio base station at present or within a definable period.

16 Claims, 4 Drawing Sheets

(51) Int. Cl.
*H04L 12/40* (2006.01)
*H04L 12/46* (2006.01)
*H04W 88/08* (2009.01)
*H04W 88/06* (2009.01)

(56) References Cited

U.S. PATENT DOCUMENTS

| 2010/0035609 A1* | 2/2010 | Hui | H04W 8/06 |
| | | | 455/433 |
| 2010/0298023 A1* | 11/2010 | Jacobsohn | H04L 63/104 |
| | | | 455/525 |
| 2013/0028176 A1 | 1/2013 | LeSage | |

OTHER PUBLICATIONS

IEC ED—IEC; Part 3: Parallel Redundancy Protocol (PRP) and High-availability Seamless Redundancy (HSR); Internet Citation; pp. 1-62; XP002680227; URL:http://Iamspeople.epfl.ch/kirrmann/Pubs/IEC_61439-3/WG15-12-04d_62439-3_AMD_HK_101109. pdf gefunden:18.07.2016.; 5.2.4 RedBox structure; p. 40-p. 41; 2010.

Rentschler Markus et al.: "Performance analysis of parallel redundant WLAN"; Proceedings of 2012 IEEE 17th International Conference on Emerging Technologies & Factory Automation (ETFA 2012) : Krakow; Poland; Sep. 17-21, 2012; pp. 1-8, XP032350187, DOI: 10.1109/ETFA.2012.6489647, ISBN: 978-1-4673-4735-8; 2012.

Cena Gianluca et al: "An enhanced MAC to increase reliability in redundant Wi-Fi networks"; 2014 10th IEEE Workshop on Factory Communication Systems (WFCS 2014), IEEE; pp. 1-10; XP032608485; DOI: 10.1109/WFCS.2014.6837591; 2014.

Gianluca Cena et a: "Dynamic duplicate deferral techniques for redundant Wi-Fi networks"; Proceedings of the 2014 IEEE Emerging Technology and Factory Automation (ETFA); pp. 1-8.; XP055288729, DOI: 10.1109/ETFA.2014.7005156; ISBN: 978-1-4799-4845-1; col. 2-7; 2014.

PCT International Search Report and Written Opinion of International Searching Authority dated Dec. 5, 2017 corresponding to PCT International Application No. PCT/EP2017/056359 filed Mar. 17, 2017.

* cited by examiner

REDUNDANTLY OPERABLE INDUSTRIAL COMMUNICATION SYSTEM, METHOD FOR OPERATION THEREOF AND RADIO SUBSCRIBER STATION

CROSS-REFERENCE TO RELATED APPLICATIONS

This is a U.S. national stage of application No. PCT/EP2017/056359 filed Mar. 17, 2017. EP Application No. 16167676 filed Apr. 29, 2016, the entire content of which is hereby incorporated by reference.

BACKGROUND OF THE INVENTION

1. Field of the Invention

The present invention relates to a radio transceiver station, a redundantly operable industrial communication system and method for operating the communication system.

2. Description of the Related Art

An industrial automation system usually comprises a multiplicity of automation devices networked to one another via an industrial communication network and is used to control or regulate installations, machines or devices within the scope of manufacturing or process automation. On account of time-critical framework conditions in technical systems automated using industrial automation systems, real-time communication protocols, such as PROFINET, PROFIBUS or real-time Ethernet, are predominantly used for communication between automation devices in industrial communication networks.

Interruptions in communication connections between industrial automation devices or computer units of an industrial automation system are extremely problematic. In addition to a loss of information, this may result, for example, in disadvantageous repetition of transmission of measurement or diagnostic results or service requests. This causes additional utilization of communication connections of the industrial automation system which, in turn, may result in further system faults or errors.

In addition, untransmitted or incompletely transmitted messages may prevent an industrial automation system from changing to or remaining in a safe operating state, for example. In the worst-case scenario, the result may be failure of a complete production installation and costly production downtime. A particular problem regularly results in industrial automation systems from message traffic with a comparatively large number of, but relatively short, messages, thus intensifying the above problems.

In order to be able to compensate for failures of communication connections or devices, communication protocols for the bumpless redundant transmission of messages in highly available industrial communication networks have been developed. These include High-availability Seamless Redundancy (HSR) and Parallel Redundancy Protocol (PRP) which are defined in the Industrial Electrotechnical Commission (IEC) 62439-3 standard and, in the case of network faults, make it possible to transmit messages without a changeover bump with extremely short recovery times. According to High-availability Seamless Redundancy and the Parallel Redundancy Protocol, each message is duplicated by a transmitting communication device and sent on two different paths to a receiver. Redundant messages representing duplicates are filtered out of a received data stream by a communication device at the receiver end.

The IEC 62439-3 standard has previously prescribed exclusively wired transmission paths for the Parallel Redundancy Protocol (PRP) on account of relatively long latency delays in wireless communication systems and a non-deterministic transmission behavior caused thereby. Suitability of WLAN transmission paths in PRP communication networks is investigated in "Towards a Reliable Parallel Redundant WLAN Black Channel", Markus Rentschler, Per Laukemann, IEEE 2012. Parallel application of various diversity techniques for space, time and frequency, for example, can be used to compensate adequately for effects of stochastic channel fading in WLAN communication networks.

EP 2 712 124 A1 discloses a redundantly operated industrial communication system having communication devices redundantly connected to an industrial communication network, in which messages are transmitted wirelessly at least in sections. A plurality of buffer storage units for message elements received in a wired manner at a network node and for message elements to be wirelessly transmitted by the latter are provided in the industrial communication network. If a maximum buffer size is exceeded, an oldest message element in the respective buffer storage unit is deleted. Until the maximum buffer size is exceeded, the oldest message element is selected as the next message element to be wirelessly transmitted.

DE 10 2012 209509 A1 describes an apparatus for securely transmitting data between a mobile subscriber having at least one transmission apparatus and a stationary receiver. Here, the mobile subscriber can change between a plurality of radio cells. Each radio cell has at least one transmission apparatus that is connected to at least one network in a wired manner. The stationary receiver is likewise connected to the at least one network in a wired manner. Both the wireless transmission between the mobile subscriber and his respectively associated transmission apparatus and the wired transmission of data between the transmission apparatus and the at least one associated network are carried out in a redundant manner. The stationary receiver is connected to the network in a redundant and wired manner.

In order to connect automation devices having completely independent Ethernet interfaces within a redundant communication network to singly connected automation devices in a highly available manner, a Y switch is used for the respective singly connected automation device according to DE 10 2013 211406 A1. Here, the Y switch is connected to a first or second subnetwork of the redundant communication network via a first or second port, while it is directly connected or indirectly connected via a third port to the singly connected automation device. In addition, incoming data frames at the first, second and third ports are assigned to a first, second and third VLAN, respectively. In addition, the first and second ports are set up as untagged members for the first and third VLANs or for the second and third VLANs. The third port is set up as an untagged member for all three VLANs. Unicast MAC addresses learnt at the first two ports are automatically adopted as a static entry for the third VLAN. If a unicast MAC address learnt at the first two ports is deleted, the corresponding static entry for the third VLAN is also deleted.

SUMMARY OF THE INVENTION

It is an object of the present invention to provide a redundantly operable industrial communication system having wireless transmission paths, which communication system has a high degree of reliability and makes it possible to efficiently use radio resources, and to provide a method for operating the system and suitable system components.

This and other objects and advantages are achieved in accordance with the invention by a communication system, a method and a radio subscriber station, where the communication system in accordance with the invention comprises at least a first and a second communication device redundantly connected to an industrial communication network and respectively having at least a first and a second communication network connection. A signal processing unit is connected to the first and second communication network connections and has a multiplexer unit for forwarding data frames to be transmitted to both communication network connections in a parallel manner and a redundancy handling unit for processing data frames received from both communication network connections. Here, the redundancy handling unit comprises a filter unit that is configured to detect received redundant data frames, in particular via appropriate configuration.

In accordance with the invention, the first communication device is respectively connected directly or indirectly to a radio subscriber station via its first and second communication network connections. In a similar manner, the second communication device is respectively connected directly or indirectly to a radio base station via its first and second communication network connections. An indirect connection can be effected, for example, via a switch to which the respective communication device and the respective radio subscriber or radio base stations are connected. The radio subscriber or radio base stations can be assigned, for example, to a Wireless Local Area Network, an Interoperability for Microwave Access (WiMAX), a Universal Mobile Telecommunication System (UMTS), a Long Term Evolution (LTE) mobile radio network or another mobile radio network. The radio subscriber stations are configured to interchange messages relating to available radio base stations with one another. In addition, the radio subscriber stations are configured such that the messages are used to coordinate which of the radio subscriber stations has an exclusive authorization for a radio connection to a selected radio base station currently and/or within a definable period.

The communication system in accordance with the invention provides the advantage that a practice of interchanging messages between the two radio subscriber stations ensures that the two radio subscriber stations are not simultaneously connected to the same radio base station, in particular during roaming operations. The radio subscriber stations are preferably configured such that a temporary exclusive assignment of a radio base station to a radio subscriber station is respectively stated in the messages. This ensures a particularly reliable assignment between radio subscriber stations and radio base stations. In addition, the radio subscriber stations can be configured such that, in the event of a radio connection to a selected radio base station being cleared or not being used, the messages are used to release a previously used radio connection to the selected radio base station. This makes it possible to efficiently use radio resources.

In accordance with one advantageous embodiment of the present invention, mutually redundant data frames are identified by a uniform sequence number. Here, the signal processing units of the first and second communication devices are configured to allocate a sequence number to a data frame to be redundantly transmitted. The radio subscriber stations are preferably configured such that, if a data frame transmitted via a radio network is successfully received, a confirmation message is transmitted, at the receiver end, to a radio subscriber station at the transmitter end. Furthermore, the radio subscriber stations are preferably configured such that transmission of a redundant data frame having a sequence number assigned to a confirmation message received at the transmitter end is prevented. If a data frame has already been transmitted via a faster radio connection, for example, a data frame that is redundant with respect to the data frame no longer needs to be transmitted in a delayed manner or via a slower radio connection but, rather, it can be discarded at the transmitter end. This makes it possible to use resources more efficiently.

Data frames to be redundantly transmitted are preferably transmitted in accordance with the Parallel Redundancy Protocol. In this case, the first and second communication devices may be a PRP RedBox, for example. A singly connected communication device can be respectively connected to the industrial communication network via such a PRP RedBox.

In accordance with another embodiment of the radio communication system in accordance with the invention, at least a first and a second network infrastructure device assigned to the industrial communication network and respectively having a plurality of communication network connections and a coupling element connecting the communication network connections to one another are provided. The network infrastructure devices may be switches, for example. The coupling element of a network infrastructure device is preferably a high-speed bus or a backplane switch with an associated controller. The first communication device is redundantly connected to the first network infrastructure device via its first and second communication network connections, whereas the second communication device is redundantly connected to the second network infrastructure device via its first and second communication network connections. In addition, in accordance with the further embodiment of the radio communication system in accordance with the invention, the first and second communication devices and/or the first and second network infrastructure devices are configured such that data frames transmitted from the first communication network connection of the first and second communication devices to the respective network infrastructure device are assigned to a first virtual local area network and data frames transmitted from the second communication network connection of the first and second communication devices to the respective network infrastructure device are assigned to a second virtual local area network. Whereas the radio subscriber stations are connected to the first network infrastructure device, the radio base stations are connected to the second network infrastructure device. In addition, the radio subscriber stations are configured such that data frames assigned to the first virtual local area network are transmitted over a first radio network via the first radio subscriber station and data frames assigned to the second virtual local area network are transmitted over a second radio network via the second radio subscriber station. The first and second radio networks can be identified via a radio network identifier, such as via a Service Set Identifier.

In accordance with the method according to the invention for redundantly operating an industrial communication system, at least a first and a second communication device are redundantly connected to an industrial communication network. Here, the first and second communication devices respectively have at least a first and a second communication network connection and a signal processing unit that is connected to the first and second communication network connections. The signal processing unit forwards data frames to be transmitted to both communication network connections in a parallel manner and detects redundant data frames received from both communication network connections.

In accordance with the invention, the first communication device is respectively connected directly or indirectly to a radio subscriber station via its first and second communication network connections. In a corresponding manner, the second communication device is respectively connected directly or indirectly to a radio base station via its first and second communication network connections. The radio subscriber stations interchange messages relating to available radio base stations with one another. In addition, the radio subscriber stations use the messages to coordinate which of the radio subscriber stations has an exclusive authorization for a radio connection to a selected radio base station currently and/or within a definable period. The radio subscriber stations advantageously use the messages to avoid a plurality of radio subscriber stations assigned to the first communication device being simultaneously connected to the same radio base station during a roaming operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment on the basis of the drawing, in which.

DETAILED DESCRIPTION OF THE EXEMPLARY EMBODIMENTS

Figure 1:
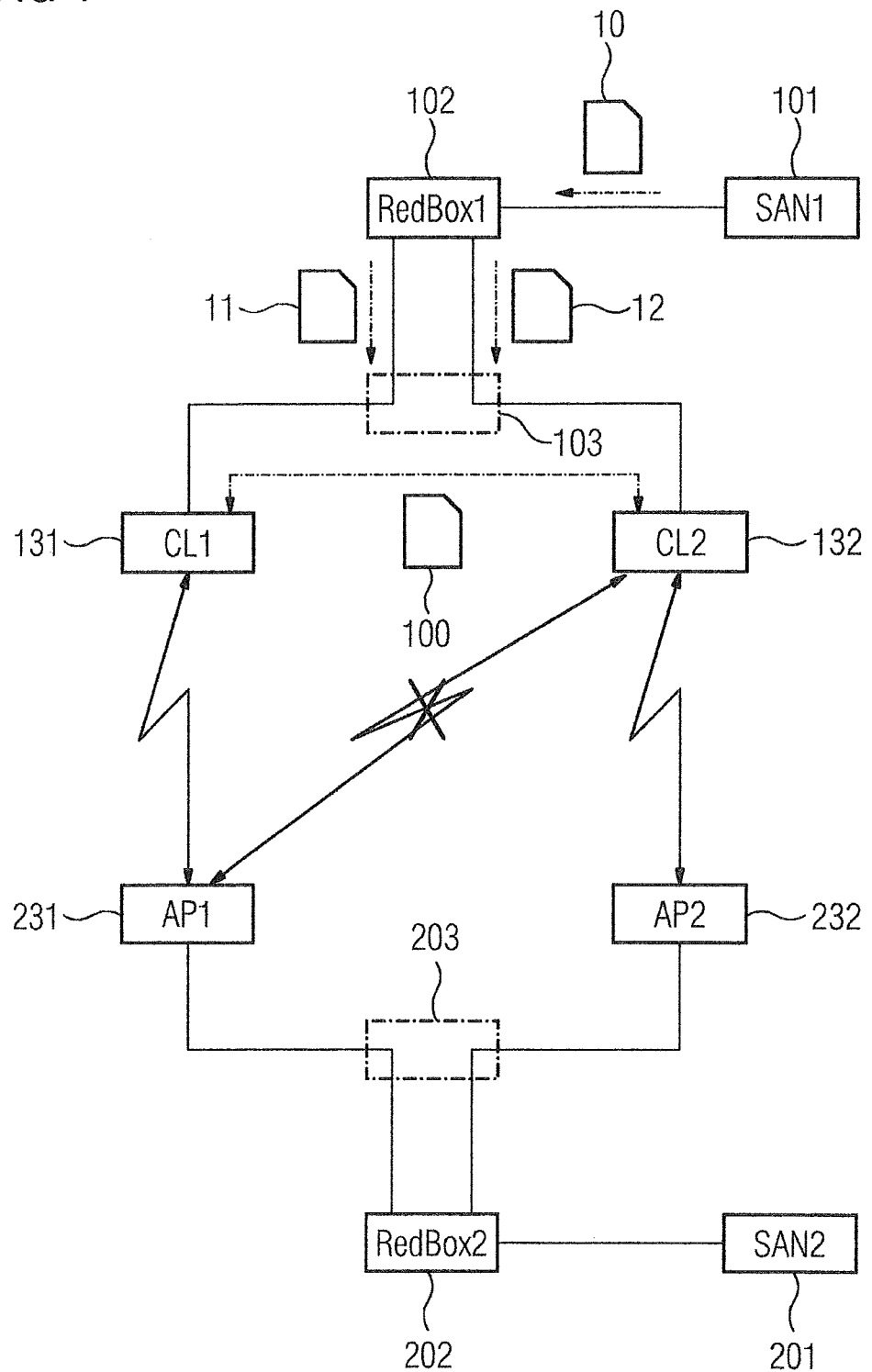
FIG. 1 shows a schematic illustration of a redundant industrial communication system having two PRP RedBoxes which are connected to one another via WLAN transmission paths in accordance with the invention.

The industrial communication system illustrated in FIG. 1 comprises a first PRP RedBox 102 and a second PRP RedBox 202 each having at least three communication network connections. In the present exemplary embodiment, the first PRP RedBox 102 is respectively connected indirectly to a WLAN subscriber station 131, 132 via its first and second communication network connections. In a corresponding manner, the second PRP RedBox 202 is respectively connected indirectly to a WLAN base station 231, 232 via its first and second communication network connections. The two PRP RedBoxes 102, 202 each have an interlink port as a third communication network connection.

In the present exemplary embodiment, a Supervisory Control and Data Acquisition (SCADA) system 101 is connected to the interlink port of the first PRP RedBox 102 on the control system level. In contrast, a sensor and actuator system 201 of an industrial automation system is connected to the interlink port of the second PRP RedBox 202 on the field level. This sensor and actuator system 201 may be, for example, a manufacturing robot, a drive for a conveyor system or an operating and observation station on a production line.

The first PRP RedBox 102 and the second PRP RedBox 202 each have a signal processing unit that is connected to their first and second communication connections and has a multiplexer unit for forwarding data frames (frames) to be transmitted to the respective first and second communication network connections in a parallel manner. A multiplexer unit duplicates data frames 10 transmitted from a communication or automation device singly connected to an industrial communication network. Mutually redundant data frames 11, 12 are identified by a uniform sequence number that is allocated by the respective signal processing unit to data frames to be redundantly transmitted. The mutually redundant data frames 11, 12 are then forwarded from the respective PRP RedBox 102, 202 to a first and a second WLAN subscriber or WLAN base station 131-132, 231-232.

In addition, the first PRP RedBox 102 and the second PRP RedBox 202 each have a redundancy handling unit for processing data frames received from the respective first and second communication network connections. The redundancy handling unit in turn comprises a filter unit that is provided for the purpose of detecting and filtering out received redundant data frames. Furthermore, a storage unit that stores sequence numbers of data frames that have already been received without errors is respectively assigned to the respective signal processing unit. If a new data frame is received, then the redundancy handling unit checks for a match with a sequence number which has already been stored. In the present exemplary embodiment, data frames to be redundantly transmitted are transmitted in accordance with the Parallel Redundancy Protocol. In principle, transmission in accordance with High-availability Seamless Redundancy is also possible. The statements below similarly apply to this.

The WLAN subscriber stations 131, 132 are configured to interchange messages 100 relating to available WLAN base stations with one another. The WLAN subscriber stations 131, 132 use the messages 100 to coordinate which of the WLAN subscriber stations 131, 132 has an exclusive authorization for a radio connection to a selected WLAN base station currently or within a definable period. The WLAN subscriber stations 131, 132 respectively state a temporary exclusive assignment of a WLAN base station 231, 232 to a WLAN subscriber station 131, 132 in the messages 100. In addition, in the event of a radio connection to a selected WLAN base station 231, 232 being cleared or not being used, the WLAN subscriber stations 131, 132 use the messages 100 to enable a previously used radio connection to the selected WLAN base station 231, 232. In particular, the WLAN subscriber stations 131, 132 use the messages 100 to avoid a plurality of WLAN subscriber stations 131, 132 assigned to the first PRP RedBox 102 being simultaneously connected to the same WLAN base station 231, 232 during a roaming operation.

Figure 2:
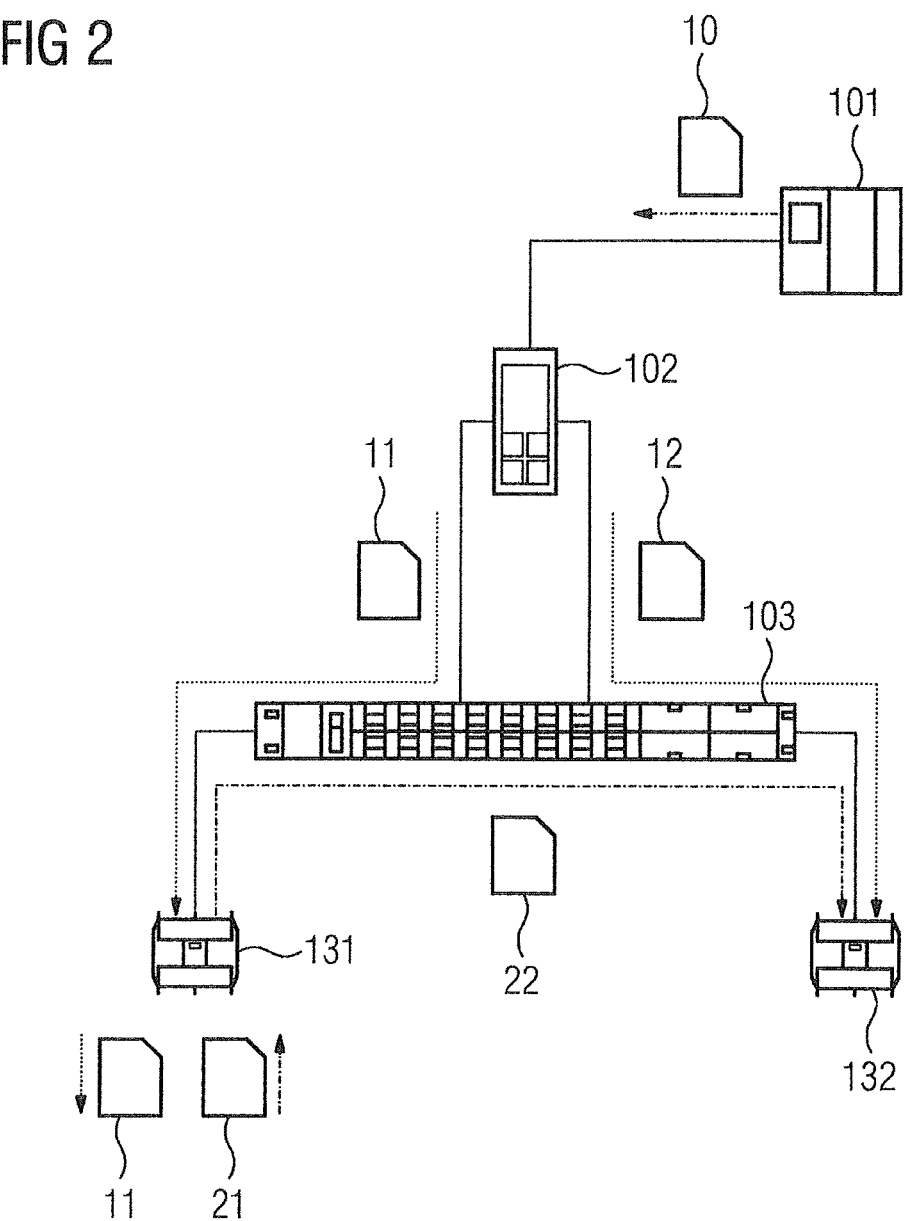
FIG. 2 shows a detailed illustration of a first part of the communication system of FIG. 1 having a first PRP RedBox, a first VLAN-enabled switch and a plurality of WLAN subscriber stations connected to the first switch.
Figure 3:
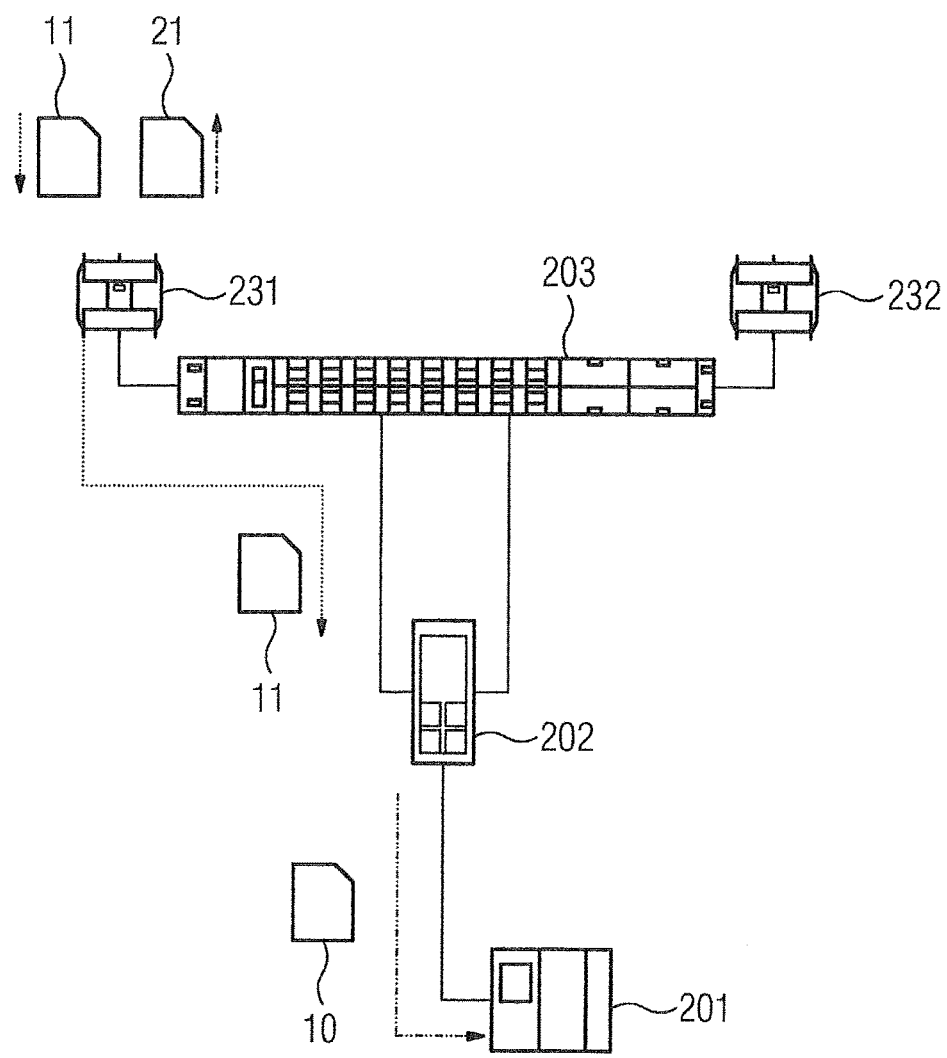
FIG. 3 shows a detailed illustration of a second part of the communication system of FIG. 1 having a second PRP RedBox, a second VLAN-enabled switch and a plurality of WLAN base stations connected to the second switch.

According to the detailed illustration of the first part of the industrial communication system, the first PRP RedBox 102 of FIG. 2 is redundantly connected to a first VLAN-enabled switch 103 via its first and second communication network connections. In a similar manner, the second PRP RedBox 202 according to the detailed illustration of the second part of the industrial communication system of FIG. 3 is redundantly connected to a second VLAN-enabled switch 203 via its first and second communication network connections. The first switch 103 and the second switch 203 each comprise a plurality of communication network connections and a coupling element that connects the communication network connections to one another. Such a coupling element may be implemented, for example, via a high-speed bus or a backplane switch with an associated controller.

Data frames transmitted from the first communication network connection of the first PRP RedBox 102 and of the second PRP RedBox 202 to the respective switch 103, 203 are assigned to a first VLAN. In a similar manner, data frames transmitted from the second communication network connection of the first PRP RedBox 102 and of the second PRP RedBox 202 to the respective switch 103, 203 are assigned to a second VLAN. Data frames assigned to the first VLAN are transmitted via a first WLAN network having a first WLAN SSID via the respective first WLAN subscriber or WLAN base station 131, 231, while data frames assigned to the second VLAN are transmitted via a second WLAN network having a second WLAN SSID via the respective second WLAN subscriber or WLAN base station 132, 232. In this case, the first WLAN SSID and the second WLAN SSID differ from one another. In principle, the first WLAN subscriber or WLAN base stations 131, 231 and the second WLAN subscriber or WLAN base stations 132, 232 can also be assigned to the second and first WLAN networks, respectively, for other data traffic.

If a data frame transmitted via the first or second WLAN network is successfully received, the WLAN subscriber or WLAN base stations 131-132, 231-232 transmit, at the receiver end, an acknowledge message 21 to a WLAN subscriber or WLAN base station 131 at the transmitter end. If an acknowledgement message 21 is received, then this WLAN subscriber or WLAN base station 131 at the transmitter end transmits a drop frame message 22 to its associated partner WLAN subscriber or base station 132 which is connected to the same switch 103. In response to such a drop frame message 22, the respective partner WLAN subscriber or base station 132 prevents transmission of a redundant data frame having a sequence number assigned to an acknowledgement message 21 received at the transmitter end. This can be achieved, for example, by deleting or discarding a redundant data frame from a transmission queue of the partner WLAN subscriber or base station, in particular as soon as this data frame arrives at the partner WLAN subscriber or base station after transmission from the respective switch.

For an increased data throughput with regard to data frames transmitted by WLAN, data frames to be transmitted are preferably no longer transmitted by the WLAN subscriber or WLAN base stations according to the FIFO principle after duplication via a PRP RedBox, but rather their transmission sequence is sorted according to destination MAC addresses. In this case, an original sequence according to reception times at the respective WLAN subscriber or WLAN base station is retained in this case within a destination MAC address. In addition, coordinated transmission queue management at mutually assigned partner WLAN subscriber or base stations preferably ensures that data frames are never transmitted to the same destination MAC address at the same time via the two partner WLAN subscriber or base stations.

Figure 4:
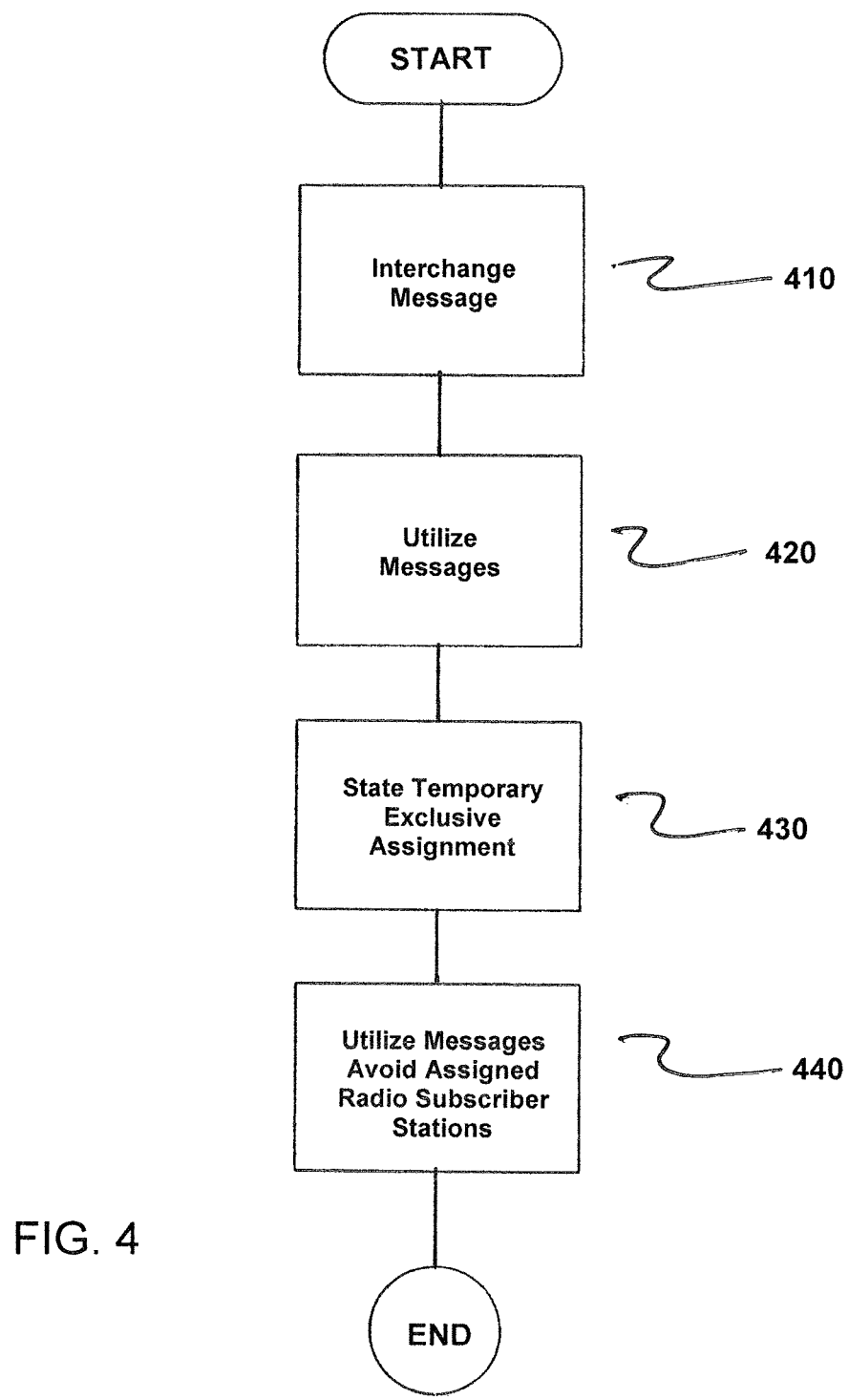
FIG. 4 is a flowchart of the method in accordance with the invention.

FIG. 4 is a flowchart of a method for redundantly operating an industrial communication system, where at least a first and a second communication device is redundantly connected to an industrial communication network, the first and second communication devices respectively includes at least a first and a second communication network connection and a signal processing unit that is connected to the first and second communication network connections and that forwards data frames to be transmitted to both communication network connections in a parallel manner and detects redundant data frames received from both communication network connections, where the first communication device is respectively connected directly or indirectly to a radio subscriber station via its first and second communication network connections, and where the second communication device is respectively connected directly or indirectly to a radio base station via its first and second communication network connections.

The method comprises interchanging message between the radio subscriber stations relating to available radio base stations, as indicated in step 410.

Next, the messages are utilized by the radio subscriber stations to coordinate which of the radio subscriber stations has an exclusive authorization for a radio connection to a selected radio base station at least one of (i) currently and (ii) within a definable period, as indicated in step 420.

Next, respective radio subscriber stations respectively state, a temporary exclusive assignment of a radio base station to a radio subscriber station in the messages, as indicated in step 430.

Next, the messages are now utilized by the radio subscriber stations to avoid a plurality of radio subscriber stations assigned to the first communication device being simultaneously connected to the same radio base station during a roaming operation, as indicated in step 440.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A redundantly operable industrial communication system comprising:
    at least a first and a second communication device redundantly connected to an industrial communication network, each of the first and second communication device respectively including:
        at least a first and a second communication network connection, and
        a signal processing unit which is connected to the first and second communication network connections and which has a multiplexer unit for forwarding data frames to be transmitted to both communication network connections in a parallel manner and a redundancy handling unit for processing data frames received from both communication network connections, the redundancy handling unit comprising a filter unit which is configured to detect received redundant data frames;

wherein the first communication device is respectively connected directly or indirectly to a radio subscriber station via its first and second communication network connections;

wherein the second communication device is respectively connected directly or indirectly to a radio base station via its first and second communication network connections;

wherein the radio subscriber stations are configured and to interchange messages relating to available radio base stations with one another, wherein the radio subscriber stations are further configured such that the messages are used to coordinate which of the radio subscriber stations has an exclusive authorization for a radio connection to a selected radio base station at least one of (i) currently and (ii) within a definable period;

wherein the radio subscriber stations are configured and such that a temporary exclusive assignment of a radio base station to a radio subscriber station is respectively stated in the messages; and wherein the radio subscriber stations are configured such that the messages are used to avoid a plurality of radio subscriber stations assigned to the first communication device being simultaneously connected to the same radio base station during a roaming operation.

2. The communication system as claimed in claim 1, wherein the radio subscriber stations are configured to utilize the messages to release a previously used radio connection to the selected radio base station, in an event of a radio connection to a selected radio base station being one of (i) cleared and (ii) unused.

3. The communication system as claimed in claim 1, wherein mutually redundant data frames are identified by a uniform sequence number; and wherein the signal processing units of the first and second communication devices are configured and to allocate a sequence number to a data frame to be redundantly transmitted.

4. The communication system as claimed in claim 2, wherein mutually redundant data frames are identified by a uniform sequence number; and wherein the signal processing units of the first and second communication devices are configured and to allocate a sequence number to a data frame to be redundantly transmitted.

5. The communication system as claimed in claim 3, wherein the radio base stations are configured to transmit a confirmation message to a radio subscriber station at the transmitter end, if a data frame transmitted via a radio network is successfully received at the receiver end; and wherein the radio subscriber stations are configured to prevent transmission of a redundant data frame having a sequence number assigned to a confirmation message received at the transmitter end.

6. The communication system as claimed in claim 1, wherein data frames to be redundantly transmitted are transmitted in accordance with Parallel Redundancy Protocol, and wherein the radio subscriber stations and the radio base stations are assigned to at least one of (i) a Wireless Local Area Network, (ii) a Worldwide Interoperability for Microwave Access (WiMAX), (iii) a Universal Mobile Telecommunications System (UMTS) and (iv), a Long Term Evolution (LTE) mobile radio network or another mobile radio network.

7. The communication system as claimed in claim 6, wherein the first and second communication devices are a Parallel Redundancy Protocol (PRP) RedBox; and wherein a singly connected communication device is respectively connected to the industrial communication network via the first and second communication devices.

8. The communication system as claimed in claim 1, further comprising:

at least a first and a second network infrastructure device assigned to the industrial communication network and respectively having a plurality of communication network connections and a coupling element connecting the communication network connections to one another;

wherein the first communication device is redundantly connected to the first network infrastructure device via its first and second communication network connections;

wherein the second communication device is redundantly connected to the second network infrastructure device via its first and second communication network connections;

wherein at least one of (i) the first and second communication devices and (ii) the first and second network infrastructure devices are configured to assign data frames transmitted from the first communication network connection of the first and second communication devices to the respective network infrastructure device to a first virtual local area network and to assign data frames transmitted from the second communication network connection of the first and second communication devices to the respective network infrastructure device to a second virtual local area network;

wherein the radio subscriber stations are connected to the first network infrastructure device;

wherein the radio base stations are connected to the second network infrastructure device; and wherein the radio subscriber stations are configured to transmit data frames assigned to the first virtual local area network over a first radio network via the first radio subscriber station and to transmit data frames assigned to the second virtual local area network over a second radio network via the second radio subscriber station.

9. A method for redundantly operating an industrial communication system, at least a first and a second communication device being redundantly connected to an industrial communication network, the first and second communication devices respectively including at least a first and a second communication network connection and a signal processing unit which is connected to the first and second communication network connections and which forwards data frames to be transmitted to both communication network connections in a parallel manner and detects redundant data frames received from both communication network connections, the first communication device being respectively connected directly or indirectly to a radio subscriber station via its first and second communication network connections, and the second communication device being respectively connected directly or indirectly to a radio base station via its first and second communication network connections, the method comprising:

interchanging message between the radio subscriber stations relating to available radio base stations;

utilizing, by the radio subscriber stations, the messages to coordinate which of the radio subscriber stations has an exclusive authorization for a radio connection to a selected radio base station at least one of (i) currently and (ii) within a definable period;

stating, by respective radio subscriber stations, a temporary exclusive assignment of a radio base station to a radio subscriber station in the messages; and utilizing, by the radio subscriber stations, the messages to avoid a plurality of radio subscriber stations assigned to the first communication device being simultaneously connected to the same radio base station during a roaming operation.

10. The method as claimed in claim 9, wherein the radio subscriber stations utilize the messages to release a previously used radio connection to the selected radio base station in an event of a radio connection to a selected radio base station being one of (i) cleared and (ii) unused.

11. The method as claimed in claim 9, wherein mutually redundant data frames are identified by a uniform sequence number; and wherein the signal processing units of the first and second communication devices allocate a sequence number to a data frame to be redundantly transmitted.

12. The method as claimed in claim 10, wherein mutually redundant data frames are identified by a uniform sequence number; and wherein the signal processing units of the first and second communication devices allocate a sequence number to a data frame to be redundantly transmitted.

13. The communication system as claimed in claim 11, wherein the radio base stations transmit a confirmation message to a radio subscriber station at the transmitter end, if a data frame transmitted via a radio network is successfully received at the receiver end; and wherein the radio base stations prevent transmission of a redundant data frame having a sequence number assigned to a confirmation message received at the transmitter end.

14. The method as claimed in claim 9, wherein data frames to be redundantly transmitted are transmitted in accordance with a Parallel Redundancy Protocol.

15. The method as claimed in claim 9, wherein at least a first and a second network infrastructure device assigned to the industrial communication network and respectively having a plurality of communication network connections and a coupling element connecting the communication network connections to one another are provided;

wherein the first communication device is redundantly connected to the first network infrastructure device via its first and second communication network connections;

wherein the second communication device is redundantly connected to the second network infrastructure device via its first and second communication network connections;

wherein data frames transmitted from the first communication network connection of the first and second communication devices to the respective network infrastructure device are assigned to a first virtual local area network and data frames transmitted from the second communication network connection of the first and second communication devices to the respective network infrastructure device are assigned to a second virtual local area network;

wherein the radio subscriber stations are connected to the first network infrastructure device;

wherein the radio base stations are connected to the second network infrastructure device;

wherein the radio base stations are connected to the second network infrastructure device; and wherein the first radio subscriber station transmits data frames assigned to the first virtual local area network via a first radio network and the second radio subscriber station transmits data frames assigned to the second virtual local area network via a second radio network.

16. A radio subscriber station, comprising:

a processor; and memory;

wherein the radio subscriber station is configured to interchange messages relating to available radio base stations with a further radio subscriber station, the messages being utilized to coordinate which radio subscriber station has an exclusive authorization for a radio connection to a selected radio base station at least one of (i) currently and (ii) within a definable period; and wherein radio subscriber stations respectively state a temporary exclusive assignment of a radio base station to a radio subscriber station in the messages and utilize the messages to avoid a plurality of radio subscriber stations assigned to the first communication device being simultaneously connected to the same radio base station during a roaming operation.

\* \* \* \* \*